United States Patent Office 3,426,199
Patented Feb. 4, 1969

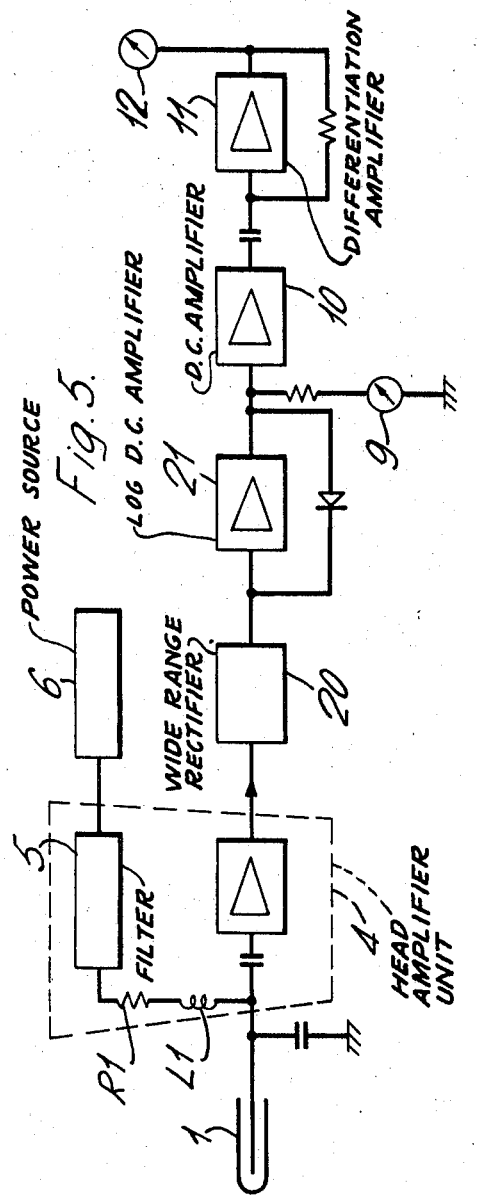

3,426,199
NUCLEAR FLUX MEASURING APPARATUS EMPLOYING CURRENT FLUCTUATIONS FROM NEUTRON DETECTORS
Eliot Patrick Fowler, Studland, Swanage, Dorset, Donald Harrison, Broadstone, Dorset, and Roy William Levell, Poole, Dorset, England, assignors to United Kingdom Atomic Energy Authority, London, England
Filed July 19, 1965, Ser. No. 472,942
Claims priority, application England, July 22, 1964, 29,635/64
U.S. Cl. 250—83.1                         8 Claims
Int. Cl. G01t 3/00

ABSTRACT OF THE DISCLOSURE

Neutron flux is commonly measured with an instrument responsive to the mean current from an ion chamber at high flux levels and with a pulse counting equipment at the lower flux levels. An alternative approach with which the instant invention is concerned uses the statistical fluctuations of the current from an ion chamber as a measure of neutron flux. This varying current is filtered to provide an A.C. input signal which is fed to a log A.C. amplifier and a rectifier providing a D.C. output proportional to the rate of pulse generation in the chamber.

This invention relates to nuclear radiation flux measuring apparatus and to circuits suitable for use therein, and has one application in log power and period meters for nuclear reactors.

The range of neutron flux levels in a nuclear reactor is normally so great that flux measuring apparatus having an output proportional to the logarithm of the flux level is widely used, such apparatus having the additional advantage that by differentiating the output, a further output inversely proportional to the reactor period is obtained. At very low flux levels, a detector which counts the individual neutrons can be used, together with an amplitude discriminator which allows counts due to particles other than neutrons, e.g. background due to alpha and gamma rays, to be eliminated. At the higher flux levels, however, it is not possible to count the individual pulses due to neutrons, and the usual practice is to measure the mean current level in a DC ionisation chamber. Unfortunately this makes the elimination of that part of the input due to alpha and gamma particles difficult to achieve.

One solution of this difficulty has been described by Gwinn and Trenholme in a paper published in I.E.E.E. Transactions in Nuclear Science, vol. NS-10, No. 2 pp. 1–9 (April 1963). Developing a concept first described by Lichtenstein in U.S. Patent No. 2,903,591, they show that if instead of using a D.C. amplifier to measure the mean current in an ionisation chamber, an A.C. amplifier followed by a rectifier is used to measure the statistical fluctuations of the current, an output is obtained which is proportional to the R.M.S. value of the charge per pulse. By contrast, the output of the D.C. amplifier is proportional to the mean value of the charge per pulse. Hence the use of an A.C. amplifier accentuates the contribution of the large-amplitude pulses due to neutrons, and correspondingly diminishes the contribution of the smaller-amplitude pulses due to the background of alpha and gamma rays.

Gwinn and Trenholme further show that the R.M.S. value of the A.C. input is proportional to the square-root of the average pulse-rate, thus giving a useful degree of signal compression prior to amplification, and also that, so long as the pulse-rate is relatively high, the rectifier following the A.C. amplifier need not in fact have an R.M.S. response, but can have a linear characteristic.

To obtain an output proportional to the logarithm of the neutron pulse-rate, Gwinn and Trenholme devised a six-stage A.C. logarithmic amplifier comprising one stage per decade of neutron pulse-rate with signal limitation at each stage, the outputs from successive stages being separately rectified and summed in a D.C. amplifier whose output is proportional to the logarithm of the input pulse-rate. Unfortunately it can be shown that the repetitive circuitry of this A.C. amplifier/rectifier has a high possibility of undetected unsafe operation from failure of any one of these repeated circuits, all of which contribute to the output.

According to the present invention in nuclear radiation flux measuring apparatus including A.C. amplifying and rectifying means for deriving a D.C. output proportional to the logarithm of the input pulse-rate, the A.C. amplifying and rectifying means comprise an A.C. amplifier having logarithmic response between input and output, followed by a linear rectifier adapted to operate over the useful output range of the A.C. amplifier.

The present invention also provides an A.C. logarithmic amplifier suitable for use as aforesaid, said amplifier comprising an A.C. feedback loop between input and output including a series circuit element having a logarithmic response. Said circuit element preferably comprises oppositely-poled, parallel-connected, semi-conductor diodes. Said amplifier may comprise an output resistor having a positive temperature co-efficient whereby the amplifier has a substantially constant temperature co-efficient over a range of input currents.

The present invention further provides a linear rectifier suitable for use as aforesaid, said rectifier comprising an A.C. amplifier, a transistor chopper circuit connected to be driven by the output of said A.C. amplifier and a connection between the input of the chopper circuit and the input of said A.C. amplifier. Said A.C. amplifier is preferably a multi-stage amplifier having signal limitations between successive stages.

Instead of using an A.C. log amplifier followed by a rectifier, a wide range linear rectifier may be employed to receive the varying current from the flux responsive instrument, the rectified signal is then amplified in a D.C. log amplifier.

To enable the nature of the present invention to be more readily understood, attention is directed, by way of example, to the accompanying drawings wherein:

FIG. 5 is a block schematic circuit of an alternative form of the invention.

Figure 1:
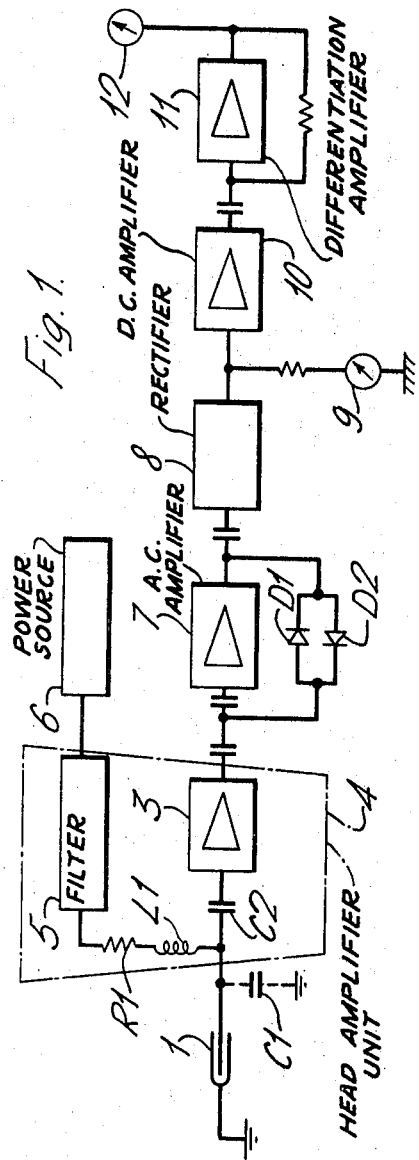
FIG. 1 is a block schematic circuit diagram of a reactor period meter embodying the present invention.

Referring to FIG. 1, the inner electrode of a neutron-sensitive ionisation chamber 1, e.g. a boron-coated, mean-current chamber type RC1, is connected via a coaxial cable having a self-capacity shown as C1, and a capacitor C2 to an amplifier 3. The presence of C2 in the connection means that only the A.C. component of the chamber output is applied to the amplifier. The inner electrode is polarised from a power supply 6 via a filter 5, a resistor R1 and an inductor L1; the amplifier 3, filter 5, resistor R1, inductor L1 and capacitor C2 form part of a head amplifier unit 4.

The arrangement is such that L1 and C1 form together a tuned input circuit of comparatively high Q. The random spacing and time of the ionising events gives a random spacing of pulses at the chamber output. These pulses are each of finite width but at high pulse rates individual pulses cannot be resolved and the output is effectively a D.C. signal with random noise superimposed on it due to the statistical nature of the pulse spacing. Noise has a substantially equal power-cycle band width and the filter circuit C1, L1 will reject all frequencies except that in the pass band and therefore the output from the filter is of varying amplitude and a sinusoidal A.C. input to amplifier 3 is developed. This input circuit, which is similar in principle to that described by Gwinn and Trenholme, is described in more detail hereinafter.

The A.C. output from the head amplifier unit 4 is passed to an A.C. amplifier 7 having a logarithmic response by virtue of the inclusion in an A.C. feedback loop of diodes D1, D2. The A.C. output of amplifier 7 is fed to a linear rectifier 8, whose output, representing neutron flux level on a logarithmic scale, is shown on a meter 9. The output of rectifier 8 is also amplified further in a D.C. amplifier 10 before differentiation in amplifier 11, the output of which is shown on meter 12 and indicates reciprocal period. A suitable logarithmic A.C. amplifier and linear rectifier are described in more detail hereinafter.

Figure 2:
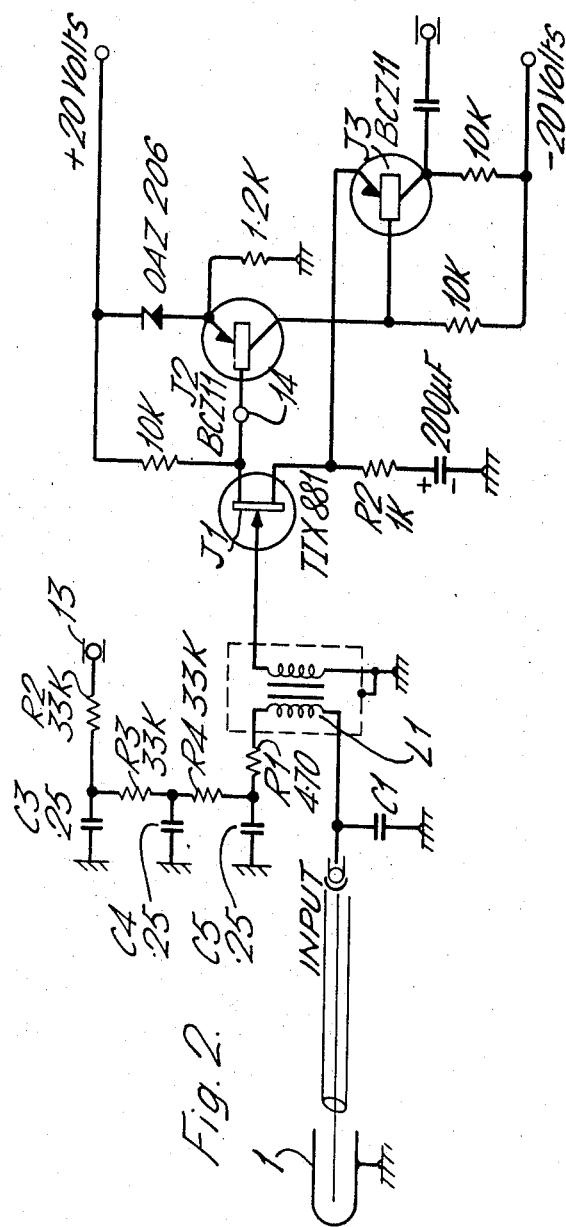
FIG. 2 is a circuit diagram of an input circuit for use in the circuit of FIG. 1.

FIG. 2 shows the detailed circuit of a head amplifier unit 4, including component values. The output of the power supply 6 of FIG. 1 is applied to a terminal 13, and the filter 5 of FIG. 1 is formed by the series resistors R2, R3, R4 and the parallel capacitors C3, C4, C5. The self-capacitance C1 of the coaxial connector forms with L1 the primary magnetising inductance of a transformer, a parallel circuit having a resonant frequency of about 1 kc./s. The A.C. input signal developed across this resonant circuit is applied via L2 the secondary of the transformer to the base of a field-effect transistor J1 (type T1X881), whose high input impedance avoids excessive damping of the high-Q resonant circuit. The output from J1 is taken from terminal 14. As already mentioned, the amplitude of the A.C. signal applied to J1 is proportional to the square-root of the neutron flux, which reduces the amplitude range of the signals to be handled by J1; the eight decades of reactor power required to be measured can thus be covered by head amplifier outputs of four decades of signal.

Figure 3:
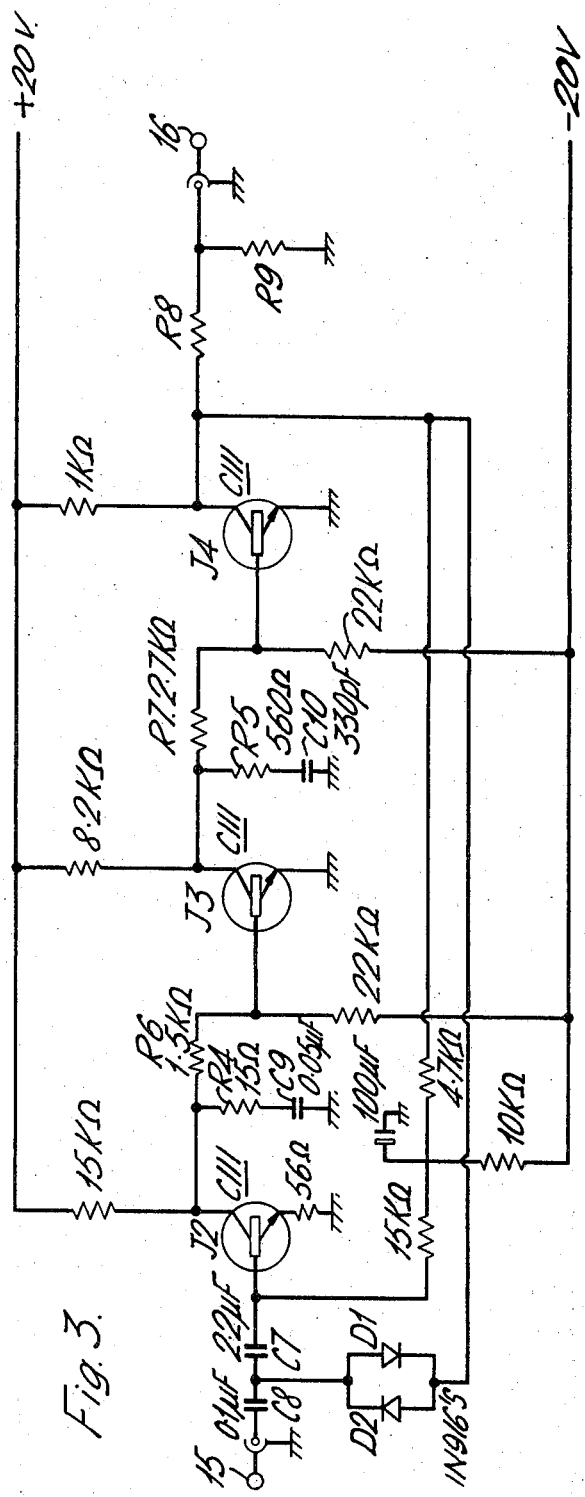
FIG. 3 is a circuit diagram of a logarithmic A.C. amplifier according to the present invention.

FIG. 3 shows a three-stage D.C. coupled logarithmic amplifier, suitable for use as amplifier 7 in FIG. 1, comprising three n-p-n transistors J2, J3, J4 connected in earthed-emitter configurations. The logarithmic A.C. characteristic of the amplifier is provided by the pair of oppositely-poled, parallel-connected, semi-conductor diodes, D1, D2, connected between the collector of J4 and, via capacitor C7, the base of J2. The input is applied via terminal 15 and capacitor C8, and the output taken from terminal 16.

D.C. feedback has been applied to stabilise the operating conditions against variations of transistor parameters with temperature. A.C. feedback occurs through the two diodes D1 and D2. These diodes act as small signal variable resistors, and, with the input capacitance of the amplifier form an integrating network in the feedback path the "time constant" of which can vary over four or five decades, depending on signal level. To prevent this effect causing amplifier instability two phase correcting networks R4, R6 and C9; and R5, R7 and C10 have been inserted in the forward path of the amplifier. The design of these phase correcting networks follows the principles described in Report A.E.E.W.–R170 (published by H.M.S.O.) with reference to a design of D.C. logarithmic amplifier.

The required forward (open loop) gain of the amplifier, using a pair of oppositely-poled, semi-conductor diodes as the logarithmic element, is very modest as, although a wide range of input and therefore feedback current has to be catered for, the large output current is required only when the input current is large so that a forward gain of $10^4$ is sufficient.

This amplifier does not include automatic temperature stabilisation for diodes D1, D2, but the temperature coefficient is made substantially independent of input current. It is found that, with a forward-conducting semiconductor diode type IN916, the voltage across it drops by about 2 mv./° C. at high current levels (about $10^3$ a.) but by about 3 mv./° C. at low currents (about $10^{-8}$ a.). In the present amplifier the high-current temperature drift is increased by 1 mv./° C. by feeding the amplifier output through a positive temperature coefficient resistor, R8, to a constant resistive load R9. Correction of the 3 mv./° C. (which is now independent of input current) is achieved by temperature adjustment of the zero offset current in the meter 9 (FIG. 1) following the rectifier.

Figure 4:
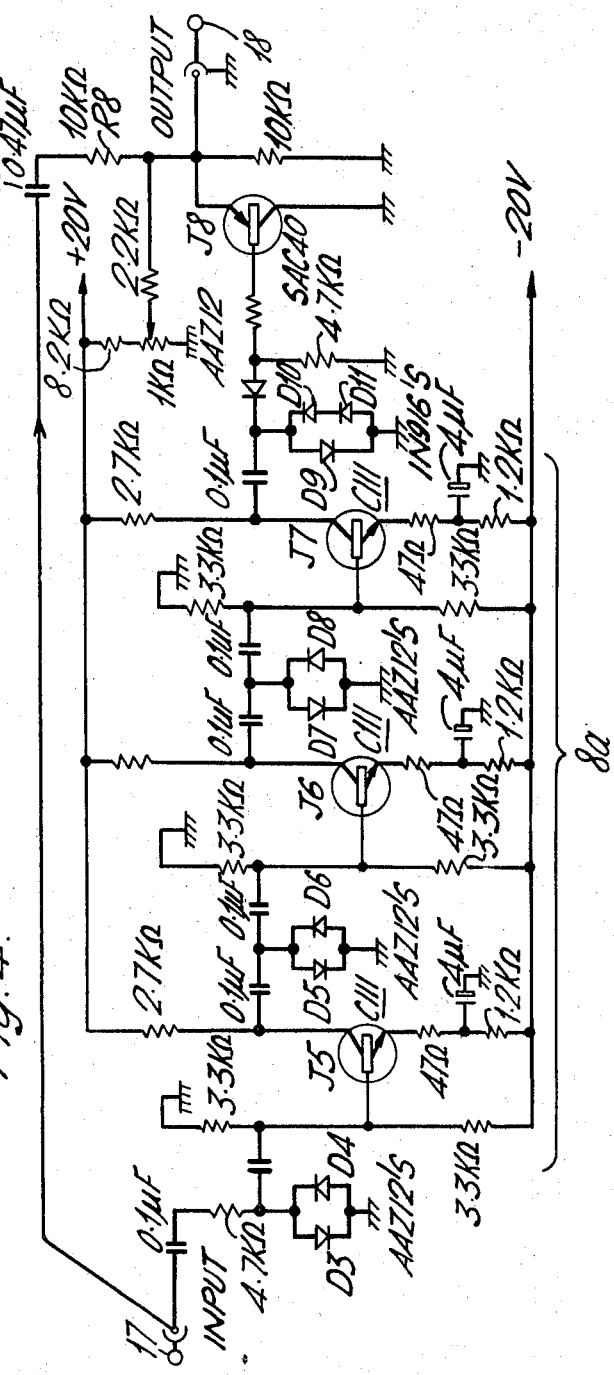
FIG. 4 is a circuit diagram of a linear rectifier according to the present invention.

FIG. 4 shows a linear rectifier suitable for use as rectifier 8 in FIG. 1. It comprises a three-stage A.C.-coupled saturating amplifier 8a including n-p-n transistors J5, J6 and J7 connected in earthed-emitter configuration, connected to drive the base of an earthed-collector chopper transistor J8. The signal input is applied simultaneously via terminal 17 to the base of J5 and via capacitor C12 and resistor R8 to the emitter of J8, whence the output is taken via terminal 18. The chopper is thus driven in synchronism with the input waveform, the phasing being such as to provide an output of negative polarity. The saturating characteristic of the amplifier is achieved by the pairs of oppositely-poled, parallel-connected diodes, D3, D4; D5, D6; D7, D8 which precede each stage respectively, and by D9 in parallel with D10 and D11 in the output circuit of the final stage. These diodes serve to limit the maximum signal obtainable and convert the sinusoidal input to a square-wave for switching the base of J8. The use of D10 and D11 in series allows the base of J8 to be driven sufficiently negative during its conducting half-cycle.

FIGS. 3 and 4 include component values suitable for embodiments for use with the head amplifier unit of FIG. 2.

The chopper drive amplifier 8a may, with advantage, be replaced in part by a mono-stable or bi-stable circuit the triggering action of which helps to reduce the noise introduced by the chopper rectifier circuit at low signal levels.

FIG. 5 shows an alternative system to that shown in FIG. 1 and those parts in FIG. 5 which correspond with similar parts in FIG. 1 bear the same reference numerals. The modification in FIG. 5 resides in the use of a wide range rectifier 20 followed by a log D.C. amplifier 21 in place of the A.C. log amplifier and rectifier.

We claim:
1. Nuclear flux measuring apparatus comprising an ionisation chamber, a D.C. polarising supply for the chamber, a filter means for extracting an A.C. signal from the current fluctuations superimposed on the mean D.C. output from the chamber, an A.C. logarithmic amplifier connected to receive said A.C. signal, a linear rectifier for rectifying the output of the A.C. logarithmic amplifier and yielding a D.C. output proportional to the logarithm of the input pulse rate due to the nuclear flux.
2. Apparatus as claimed in claim 1 wherein the A.C. log amplifier comprises an A.C. feedback loop between input and output thereof including a series circuit element having a logarithmic response.
3. Apparatus as claimed in claim 2 wherein the A.C. log amplifier comprises an output resistor having a positive temperature coefficient whereby the amplifier has a substantially constant temperature coefficient over a range of input signal amplitudes.
4. Apparatus as claimed in claim 1 wherein said linear rectifier comprises an A.C. amplifier, a transistor chopper circuit connected to be driven by the output of said A.C. amplifier and a connection between the input of the chopper circuit and the input of said A.C. amplifier.
5. Apparatus as claimed in claim 4 wherein a trigger circuit is connected between said AC amplifier and said chopper circuit.

6. Apparatus as claimed in claim 1 wherein said A.C.-signal deriving means comprises a coaxial cable linking said ionisation chamber to a head-amplifier unit, said unit including an A.C. amplifier and an inductor forming with the self-capacitance of said cable a tuned circuit across which an A.C. signal due to current variations in said chamber may be developed.

7. Apparatus as claimed in claim 6 wherein said head-amplifier unit comprises a transformer whereof said inductor forms the primary winding, the secondary winding of said transformer being connected to the input of the A.C. head-amplifier.

8. Apparatus as claimed in claim 6 wherein the first stage of said A.C. head-amplifier comprises a field-effect transistor, having an input signal connection to its base.

References Cited

UNITED STATES PATENTS

| | | | |
|---|---|---|---|
| 2,818,504 | 12/1957 | De Shong | 250—83.6 X |
| 2,986,636 | 5/1961 | Carlson et al. | 250—83.1 |
| 3,069,545 | 12/1962 | Lide et al. | 250—83.1 |
| 3,234,384 | 2/1966 | Friedling et al. | 250—83.1 |

ARCHIE R. BORCHELT, *Primary Examiner.*

U.S. Cl. X.R.

250—83.6